US006369371B2

(12) United States Patent
Havens et al.

(10) Patent No.: US 6,369,371 B2
(45) Date of Patent: Apr. 9, 2002

(54) METHOD AND APPARATUS FOR HEATING ULTRAPURE WATER USING MICROWAVE ENERGY

(75) Inventors: Daniel A Havens, Gladstone, OR (US); Ralph N Williams, San Jose, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/376,270

(22) Filed: Aug. 18, 1999

(51) Int. Cl.[7] .............................. H05B 6/80; B01D 3/00

(52) U.S. Cl. ....................... 219/688; 219/679; 219/710; 202/177; 202/234

(58) Field of Search ................................ 219/688, 687, 219/710, 679; 202/234, 176, 177

(56) References Cited

U.S. PATENT DOCUMENTS

| | | | | | |
|---|---|---|---|---|---|
| 4,152,567 | A | * | 5/1979 | Mayfield | 219/688 |
| 4,288,674 | A | * | 9/1981 | Councell | 219/687 |
| 4,310,738 | A | * | 1/1982 | Moretti et al. | 219/688 |
| 4,313,798 | A | * | 2/1982 | Myers, Jr. | 202/234 |
| 4,417,116 | A | * | 11/1983 | Black | 219/688 |
| 4,826,575 | A | * | 5/1989 | Karamian | 219/688 |
| 5,521,361 | A | * | 5/1996 | Strait, Jr. | 219/688 |

* cited by examiner

*Primary Examiner*—Philip H. Leung
(74) *Attorney, Agent, or Firm*—Innovation Partners; Charles E. Gotlieb

(57) ABSTRACT

A method and apparatus heats ultrapure water using microwaves. Chambers such as pipes containing the water are capable of admitting microwaves to the water, allowing the microwaves to heat the water. The pipes may be made of inert material such as PVDF or quartz that will not introduce contamination into the water.

37 Claims, 3 Drawing Sheets

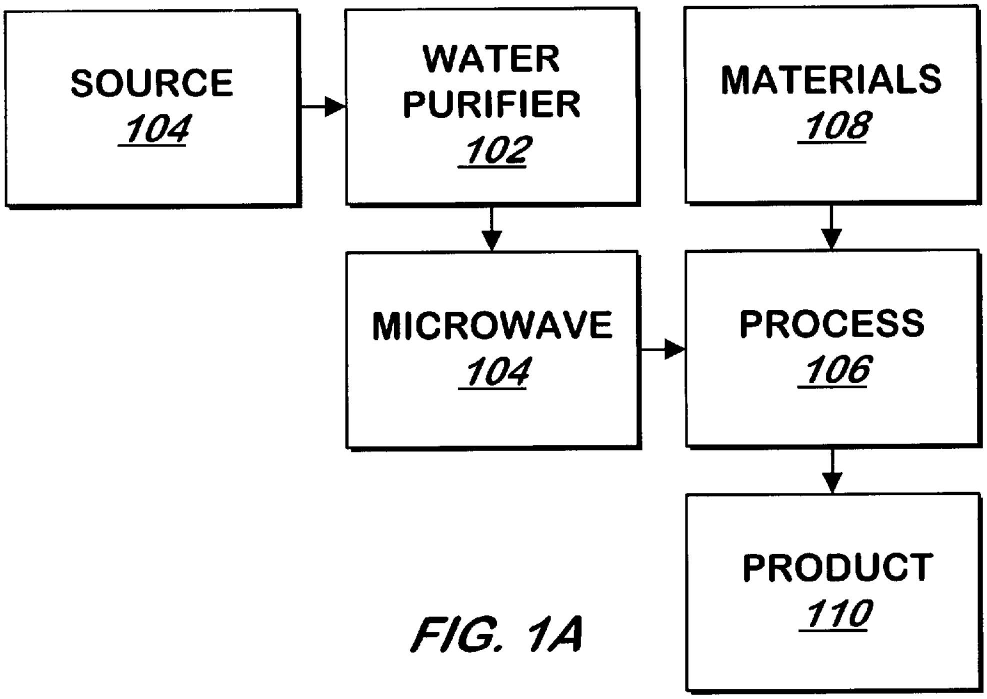
FIG. 1A
FIG. 3
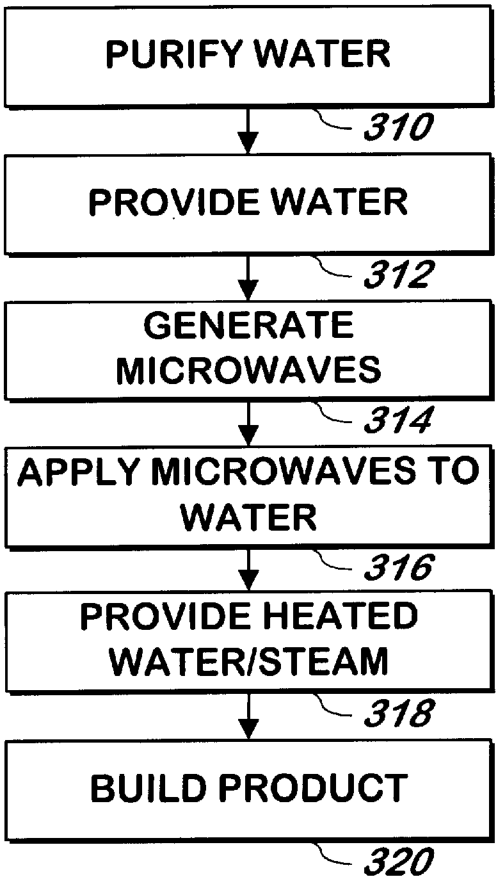

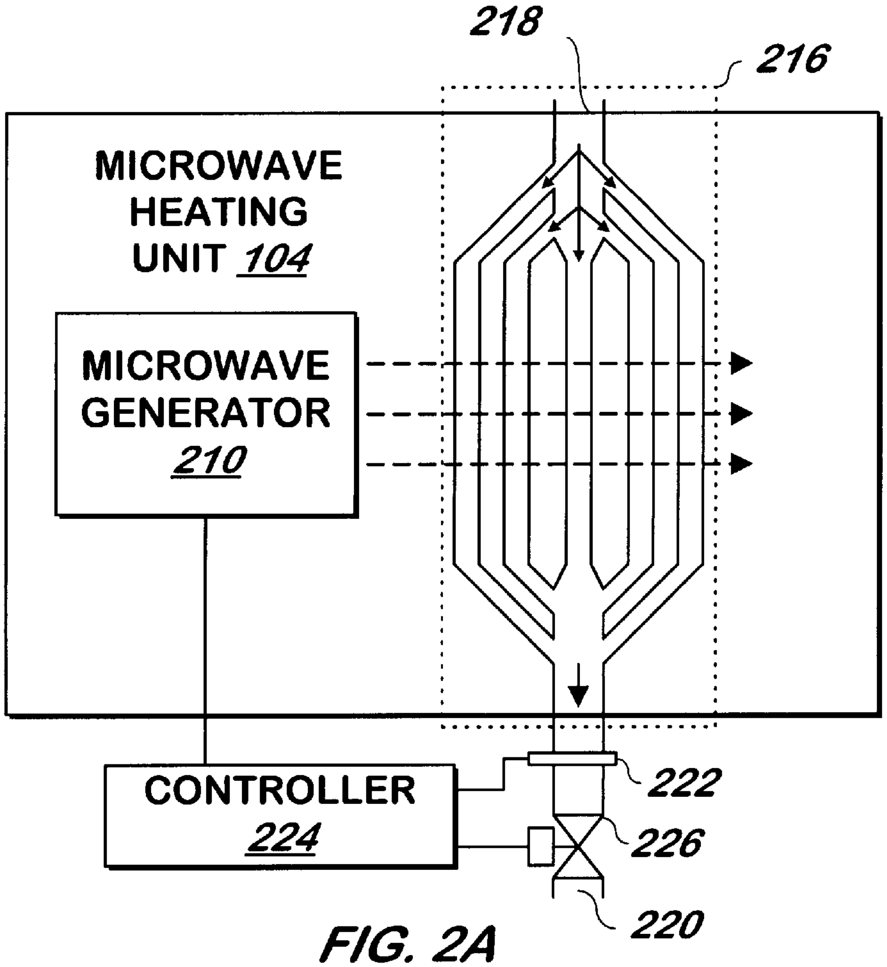
FIG. 2A
FIG. 2B
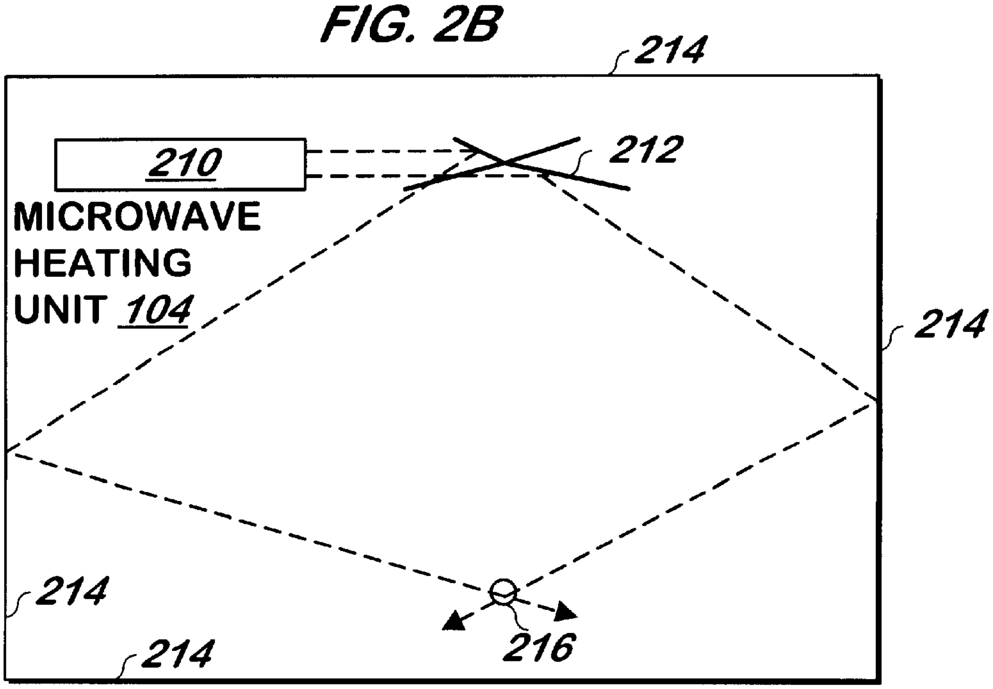

METHOD AND APPARATUS FOR HEATING ULTRAPURE WATER USING MICROWAVE ENERGY

FIELD OF THE INVENTION

The present invention is related to water heating systems and more specifically to heating systems for ultrapure water.

BACKGROUND OF THE INVENTION

Some purification systems produce ultrapure water. Such systems remove from a water supply particulates, ions, organic matter and microbes that could otherwise contaminate the process or device that uses the ultrapure water. One example of a system for producing ultrapure water is described in Sauer & Vedova, "A New Water Treatment System for the latest Generation of Semiconductor Devices", Ultrapure Water, December 1996.

Some processes require heated ultrapure water or ultrapure steam. For example, some manufacturing processes may use heated ultrapure water for producing and cleaning semiconductor wafers used to manufacture electronic devices. Other manufacturing processes may use heated ultrapure water for producing and cleaning components used to manufacture disk drives. Pharmaceutical and biotechnology manufacturing processes use heated ultrapure water for cleaning and sterilizing, and can also include ultrapure water in the finished product. In addition, heated ultrapure water may be used to clean the filters that make up the purification system. It is therefore desirable to heat ultrapure water.

Many conventional techniques exist for heating water. For example, conventional systems for heating water may use heat exchange techniques. In these techniques, heat is transferred from a liquid or gas to the liquid to be heated. Conventional heat exchange techniques use a plate and frame, double pipe, shell & tube, or other form of heat exchanger to transfer heat from a non-purified aqueous- or steam- heat source to the liquid to be heated, separated by a heat conductor. Other heat exchange techniques include cross flow systems in which heated air is passed over pipes containing the water. The pipes used in the heat exchanger have fins to improve the effective heat transfer from the air to the water. Pipes or heat conductors for such systems may be made of aluminum, copper, stainless steel, or nickel alloys, exotic metals, such as titanium, or plastics in order to maximize the heat transfer to the water.

While such systems can provide efficient heat transfer, they can contaminate ultrapure water. When heated, the conductive materials used for the piping or heat conductors can leach particulate and ionic contamination into the ultrapure water. Titanium pipes or conductors have been used in the heat exchangers instead of the other types of pipes, but as standards for ultrapure water improve, titanium introduces unacceptable amounts of impurities into the ultrapure water. Fluoropolymer pipes have also been used in heat exchangers, but such pipes are not good conductors of heat, and thus, they adversely impact the efficiency of the heat exchange.

Other heating techniques have been attempted to heat ultrapure water such as running a thin stream of ultrapure water past a current-carrying wire used as a heat source. Here too, the contamination introduced by the heated metal wire is sufficiently high to contaminate the ultrapure water. Radiant heat can be passed through quartz pipes, but quartz pipes are fragile and relatively difficult to seal.

What is needed is a method and apparatus for heating ultrapure water while minimizing the amount of contamination introduced to the water by the heating process.

SUMMARY OF INVENTION

A method and apparatus uses microwave energy to heat ultrapure water in a chamber that does not release contaminants to the water when heated. Because fluid-fluid heat exchange techniques are not used to heat the water, thermally conductive materials need not be used to transport the ultrapure water, and tubing made of inert materials may be used instead, maintaining the purity of the water. Because the heat source itself is not in contact with the water, the purity of the water is maintained.

BRIEF DESCRIPTION OF THE DRAWINGS

FIG. 1A is a block schematic diagram of an apparatus for producing ultrapure water, heating the ultrapure water and using the heated ultrapure water according to one embodiment of the present invention.

FIG. 2A is a top view of a block schematic diagram of an apparatus for heating ultrapure water according to one embodiment of the present invention.

FIG. 2B is a side view of an apparatus for heating ultrapure water according to another embodiment of the present invention.

FIG. 3 is a flowchart illustrating a method of heating ultrapure water according to one embodiment of the present invention.

DETAILED DESCRIPTION OF A PREFERRED EMBODIMENT

Figure 1B:
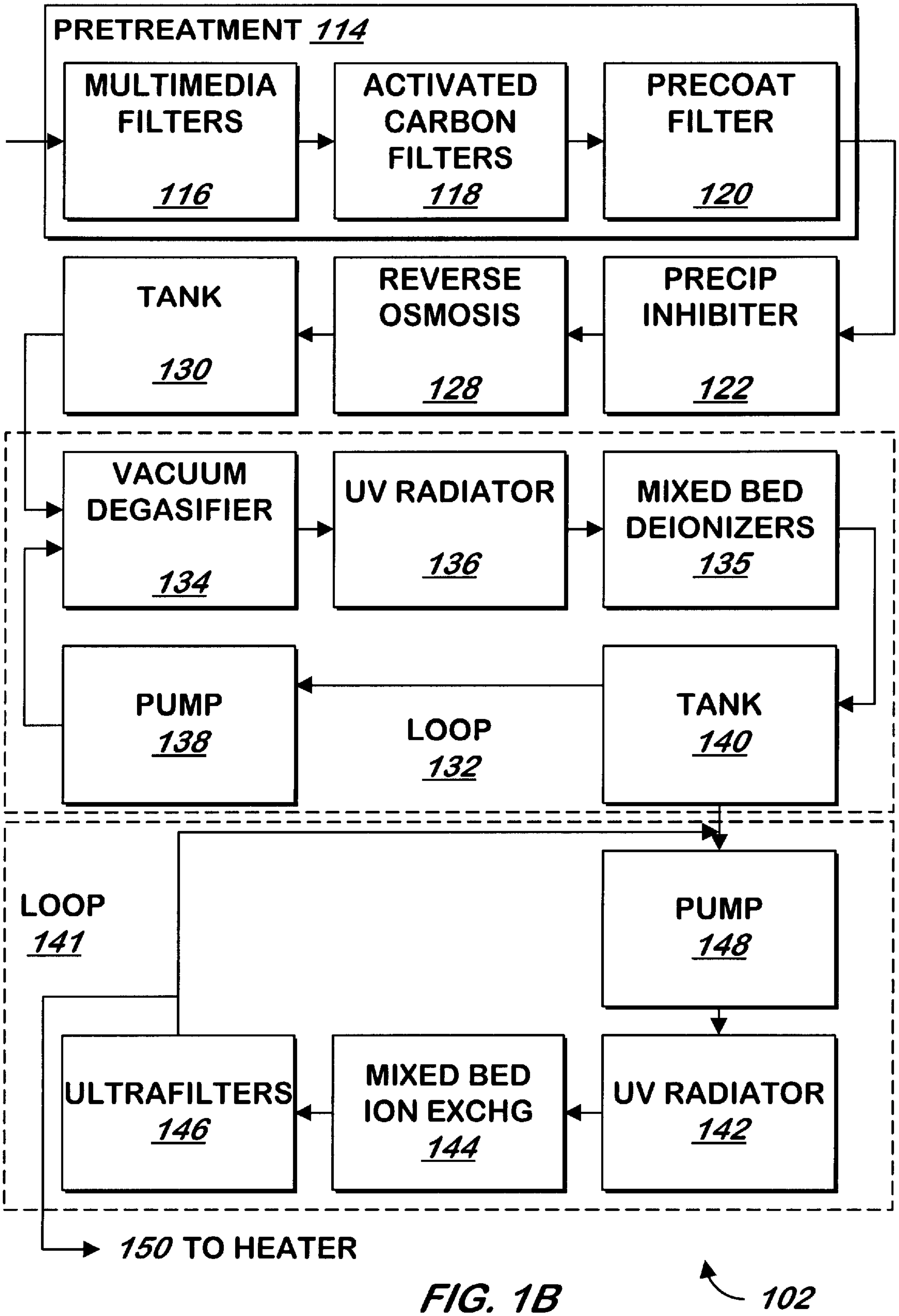
FIG. 1B (PRIOR ART)
FIG. 1B is a block schematic diagram of a conventional apparatus for producing ultrapure water.

Referring now to FIG. 1A, a system for producing and heating ultrapure water is shown according to one embodiment of the present invention. An ultrapure water purification system 102 described below receives raw water from a source 104 and purifies it to ultrapure standards of 18.2 megaohm-cm (if the water is at a temperature of 25 degrees Celsius), and containing silicon dioxide of under 0.5 parts per billion, total organic carbon of under 1 part per billion, total ionic content of less than 1 part per billion and dissolved oxygen of under 5 parts per billion. The ultrapure water contains less than one thousand 0.05 micrometer sized particles per liter, less than fifty 0.1 micrometer sized particles per liter, and microorganism contamination of no more than 1 cfu/L. In other embodiments, the specifications above are 5%, 10%, 15%, 20% or 25% higher or lower than described above.

The ultrapure water purification system 102 feeds a microwave system 104 described in more detail below, which adds heat to the ultrapure water. The heated ultrapure water is provided to process 106, which uses the heated ultrapure water or steam produced therefrom and materials 108 to produce a product 110, such as a disk drive, semiconductor device, pharmaceutical or biotechnology product. The heated ultrapure water or steam may also be used for a process, such as to mix ultrapure chemicals or to clean filters in the ultrapure water purification system 102.

Referring now to FIG. 1B, a conventional ultrapure water purification system 102 of FIG. 1A is shown although any ultrapure water purification system may be used. In one embodiment, ultrapure water purification system 102 includes pretreatment filtration 114, which includes multimedia filters 116 to filter particulate contaminants such as silt, and activated carbon filters 118 to filter total organic carbon and chlorine. Precoat filters 120 containing diatomaceous earth perform additional filtration of particulate and other matter. Water flows in the direction of the arrows in the Figure.

Precipitation inhibitor 122 adds antiscalant based on polyacrylic acid to the water to avoid calcium carbonate precipitation in subsequent portions of the apparatus, though conventional acid dosing techniques may be used.

Reverse osmosis membrane 128 separates ionic, colloidal and organic matter from the water and supplies the water to a tank 130. A loop 132 containing a vacuum degasifier 134 to remove gases such as carbon dioxide and oxygen and reduce total organic matter, UV radiator 136 to kill microorganisms and oxidize organic matter and mixed bed deionizers 135 to remove residual ions is operated by pump 138 to keep the water from stagnating.

The loop system feeds a second tank 140, which has a layer of nitrogen above the surface of the water it contains to prevent absorption of oxygen and carbon dioxide. Water is fed from tank 140 to a loop 141 containing another UV radiator 142, mixed bed ion exchange 144 and ultrafilters 146 to remove residual particulate matter, and circulated by means of pump 148. Tapped off the loop 141 and downstream of all of the filters is outlet 150, coupled to microwave heating unit described below, which heats the water.

Referring now to FIG. 2A, the microwave heating unit 104 of FIG. 1A is shown according to one embodiment of the present invention. Microwave heating unit 104 contains a conventional microwave generator 210 such as a magnetron, clystron or other microwave generating source aimed at chamber 216, which may be pipes, carrying ultrapure water, purified as described above. Chamber 216 carrying the ultrapure water received at input 218 coupled to outlet 150 of FIG. 1B allow microwaves to pass through to the water contained therein. Chamber 216 withstands the heat produced by the microwaved water without significantly contaminating the water. In one embodiment, chamber 216 is made of quartz, and in another embodiment, chamber 216 is made of polyvinylidene fluoride resin, referred to as PVDF, or Teflon PFA commercially available from E. I. du Pont de Nemours and Company of Wilmington, Del., although any chamber that admits microwaves and does not significantly contaminate the water may be used. Chamber 216 may be in the shape of one or more pipes or may be other shapes. Chamber 216 may be straight or not straight in shape. Shapes that are not straight may allow the water to come into contact with microwaves for a longer time. Microwave generator 210 generates microwaves which heats the water in the pipes to produce hot water or steam, which is provided to output 220.

In another embodiment of the present invention, shown in FIG. 2B, microwave heating unit 104 includes the components of FIG. 2A and also includes rotating fan 212 and reflectors 214. Microwaves emitted from microwave generator 210 are disbursed by rotating fan 212 and reflected by reflectors 214, both of which reflect microwave energy without significant absorption. These components operate as if they were in a conventional microwave oven for use in household cooking. Such embodiment may make more efficient use of the microwaves generated by microwave generator 210.

Referring again to FIG. 2A, in one embodiment, a sensor 222 is coupled to controller 224 which controls the operation of microwave generator 210 to provide a desired temperature of the water flowing past the sensor 222. If the water sensed by sensor 222 is too warm, controller 224 reduces the output of microwave generator 210 to reduce the temperature of the water. If the water sensed by sensor 222 is too cold, controller 224 increases the output of microwave generator 210. The output of microwave generator may be adjusted by cycling microwave generator 210 on and off or by varying the power input to microwave generator 210.

In another embodiment, sensor 222, controller 224 and a valve 226 are used to control the temperature of the water. Sensor 222 is coupled to controller 224, which is in turn coupled to control valve 226. Controller 224 opens valve 226 when water reaches a desired temperature as indicated by sensor 222, and otherwise keeps water from flowing out of microwave heating unit 104. If it is desirable to achieve a constant flow of water, unheated ultrapure water may be routed from input 218 to output 216 to make up water restricted by valve 226. In one embodiment, a valve similar to valve 226 is used on the supply of unheated ultrapure water and this valve is also controlled by controller 224 to provide a constant flow of ultrapure water. A second sensor (not shown) coupled to controller 224 may allow for detection of the temperature of the unheated ultrapure water to allow controller 224 to provide the proper mix of heated and unheated ultrapure water to provide ultrapure water at a desired temperature or within a desired temperature range.

Referring now to FIG. 3, a method of producing ultrapure hot water or steam is shown according to one embodiment of the present invention. The water is purified to ultrapure standards 310 as described above. The water that is purified in step 310 is provided 312 to an inert chamber, such as piping made from quartz, PVDF or Teflon PFA. Microwaves are generated 314 and applied 316 to the chamber, which transmits the microwaves to the water in the chamber as described above. Step 316 may include disbursing the microwaves. The microwaves alternately polarize the water molecules and then reverse polarize them over and over again at high speed, which generates heat in the water. The water is thus heated or turned to steam, and the heated water or steam is provided 318 to a process. Step 318 may include sensing the temperature of the water at one or more locations as described above and using the temperature of the water to control one or more valves or to control the generation of microwaves in step 314 in order to provide water at a desired temperature. A product is manufactured 320 using the ultrapure hot water or steam, or the ultrapure water is used in a process as described above.

What is claimed is:

1. An apparatus for providing heated ultrapure water, comprising:

an ultrapure water purification system having an inlet for receiving water having a purity level less than ultrapure, the ultrapure water purification system for purifying the water received at the ultrapure water purification system inlet to at least substantially ultrapure purity and for providing said purified water at an outlet;

a microwave generator for emitting microwaves; and at least one chamber having at least one ultrapure water inlet coupled to the ultrapure water purification system for receiving the purified water and at least one ultrapure water outlet for providing the purified water, the chamber for transporting the ultrapure water through the microwaves emitted from the microwave generator so as to cause the purified water at the at least one ultrapure water outlet to have a temperature greater than a temperature of the purified water at the at least one ultrapure water inlet.

2. The apparatus of claim 1, wherein the at least one chamber is capable of transmitting microwaves and withstanding heat emitted from the water transported through the microwaves without significantly contaminating the purified water.

3. The apparatus of claim 2 wherein the at least one chamber comprises PVDF.

4. The apparatus of claim 3 wherein the purified water provided at the at least one ultrapure water outlet comprises steam.

5. The apparatus of claim 2 wherein the at least one chamber comprises quartz.

6. The apparatus of claim 5 wherein the purified water provided at the at least one ultrapure water outlet comprises steam.

7. The apparatus of claim 2 wherein the at least one chamber comprises fluoropolymer resin.

8. The apparatus of claim 7 wherein the purified water provided at the at least one ultrapure water outlet comprises steam.

9. The apparatus of claim 2 wherein the purified water provided at the at least one ultrapure water outlet comprises steam.

10. The apparatus of claim 1 wherein the ultrapure water has a resistivity of at least 17 megaohm-cm, total organic carbon not more than 25 ppb C.

11. The apparatus of claim 10 wherein the purified water provided at the at least one ultrapure water outlet comprises steam.

12. The apparatus of claim 1 additionally comprising:

a control valve coupled to the chamber to restrict a flow of ultrapure water past the control valve;

a sensor for sensing a temperature of the purified water; and a controller coupled to the control valve and the sensor, the controller for operating the valve responsive to the sensor.

13. The apparatus of claim 12 wherein the purified water provided at the at least one ultrapure water outlet comprises steam.

14. The apparatus of claim 1 additionally comprising:

a sensor for sensing a temperature of the purified water; and a controller coupled to the microwave generator and the sensor, the controller for operating the microwave generator responsive to the sensor.

15. The apparatus of claim 14 wherein the purified water provided at the at least one ultrapure water outlet comprises steam.

16. The apparatus of claim 1 wherein the purified water provided at the at least one ultrapure water outlet comprises steam.

17. A method of providing heated ultrapure water, the method comprising:

receiving water having a purity less than ultrapure;

purifying the water having a first temperature to at least substantially ultrapure purity; and exposing the purified water received to microwave energy thereby causing the purified water to have a second temperature greater than the first temperature.

18. The method of claim 17 wherein the exposing step comprises transporting the purified water through the microwave energy.

19. The method of claim 18, wherein the transporting step comprises transporting the purified water in a chamber that is capable of transmitting the microwave energy.

20. The method of claim 19 wherein the second temperature comprises a temperature at which the purified water turns to steam.

21. The method of claim 18 wherein the second temperature comprises a temperature at which the purified water turns to steam.

22. A product produced using the method of claim 17, wherein the product comprises a microelectronic device.

23. The product of claim 22 wherein the second temperature comprises a temperature at which the purified water turns to steam.

24. A product produced using the method of claim 17, wherein the product comprises a disk drive.

25. The product of claim 24 wherein the second temperature comprises a temperature at which the purified water turns to steam.

26. A product produced using the method of claim 17, wherein the product comprises a pharmaceutical product.

27. The product of claim 26 wherein the second temperature comprises a temperature at which the purified water turns to steam.

28. A product produced using the method of claim 17, wherein the product comprises a biotechnology product.

29. The product of claim 28 wherein the second temperature comprises a temperature at which the purified water turns to steam.

30. The method of claim 17 comprising the additional step of sensing a temperature of the purified water.

31. The method of claim 30, wherein the exposing step is responsive to the sensing step.

32. The method of claim 31 wherein the second temperature comprises a temperature at which the purified water turns to steam.

33. The method of claim 30 additionally comprising a step of regulating at least one flow of purified water responsive to the sensing step.

34. The method of claim 30 wherein the second temperature comprises a temperature at which the purified water turns to steam.

35. The method of claim 17 wherein the second temperature comprises a temperature at which the purified water turns to steam.

36. A method of providing heated ultrapure water, comprising:

receiving water having a purity less than ultrapure;

purifying the water to at least substantially ultrapure purity, the purified water having a first temperature; and rapidly polarizing and reverse polarizing molecules in the water thereby causing the ultrapure water to have a second temperature greater than the first temperature.

37. The method of claim 36 wherein the second temperature comprises a temperature at which the purified water turns to steam.

* * * * *